United States Patent [19]

Schmidt

[11] 4,235,162
[45] Nov. 25, 1980

[54] EXHAUST VENT FOR COOLING RIGS TRANSPORTED ON VEHICLES

[75] Inventor: Hartmut Schmidt, Düsseldorf, Fed. Rep. of Germany

[73] Assignee: Messer Griesheim GmbH, Frankfurt am Main, Fed. Rep. of Germany

[21] Appl. No.: 870,657

[22] Filed: Jan. 19, 1978

[30] Foreign Application Priority Data

Jan. 26, 1977 [DE] Fed. Rep. of Germany ....... 2703062

[51] Int. Cl.³ .............................................. B60H 1/26
[52] U.S. Cl. ...................................... 98/19; 62/410; 98/6
[58] Field of Search .................... 98/2.14, 6, 7, 8, 19, 98/83, 122, 32 R, 42 R, DIG. 8; 62/409, 410, 412, 239, 244; 220/374, 230; 138/27, 32, 42

[56] References Cited

U.S. PATENT DOCUMENTS

| 425,831 | 4/1890 | Schaffer | 98/19 X |
| 1,078,834 | 11/1913 | Cook | 138/42 |
| 2,739,521 | 3/1956 | Spear | 98/DIG. 8 |
| 3,072,284 | 1/1963 | Luhman | 220/374 |
| 3,422,982 | 1/1969 | Terwoerds et al. | 220/374 X |

FOREIGN PATENT DOCUMENTS 2410170 9/1975 Fed. Rep. of Germany .............. 98/42

Primary Examiner—Albert J. Makay
Assistant Examiner—Harold Joyce
Attorney, Agent, or Firm—Connolly and Hutz

[57] ABSTRACT

An exhaust vent for cooling rigs transported on vehicles the interior of which is cooled by the introduction of low boiling gas includes inserts in front or behind the exhaust vent to force the outflowing gas to be deflected several times.

3 Claims, 3 Drawing Figures

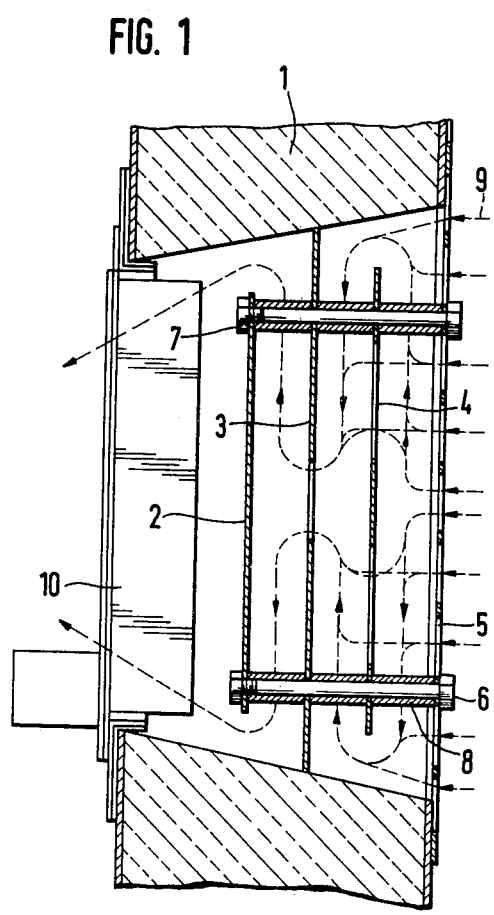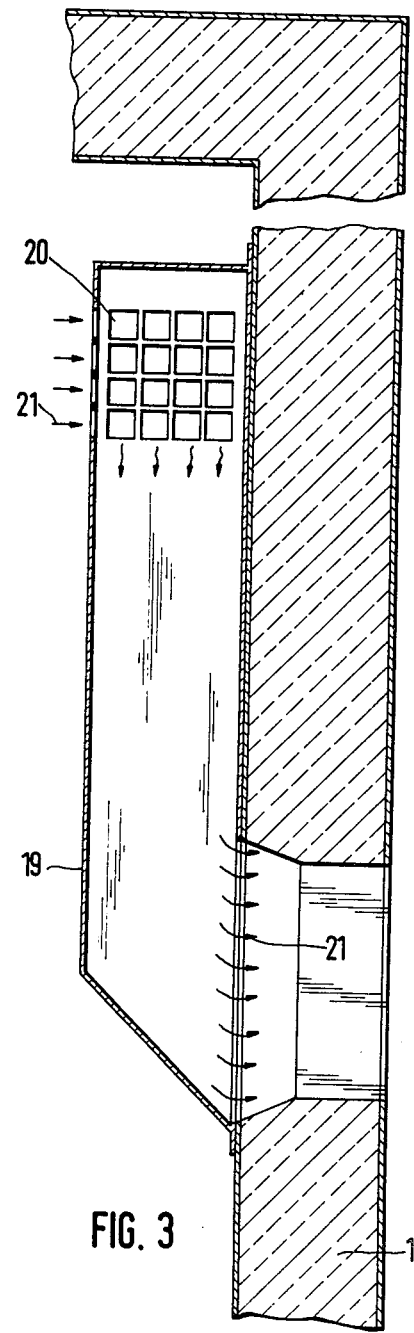

EXHAUST VENT FOR COOLING RIGS TRANSPORTED ON VEHICLES

BACKGROUND OF INVENTION

The invention is concerned with an exhaust vent for cooling rigs transported on vehicles, the interior of which cooling installation is cooled by the introduction of a low boiling liquified gas.

In the case of cooling asemblies which are equipped with apparatus for cooling with low boiling liquified gases, as for example, liquid nitrogen, it always happens repeatedly that the pressure equalizing vent is covered with wire screening or perforated sheet metal plate. Such coverings are, for example, required by customs for border crossing traffic. As a result of this covering, it can happen that on account of icing of the wire screens or perforated sheet metal plate, the pressure equalizing vent becomes sealed gas tight. Because of the excess pressure which has therefore built up in the interior of the cooling rig, accidents have already occurred upon opening the cargo door.

SUMMARY OF INVENTION

The object of the invention is to achieve a vent which cannot be sealed by icing, which makes possible the maintenance of a desired overpressure in the cargo space and which complies with customs regulations.

In the case of an exhaust vent for cooling rigs transported on vehicles, the interior of which rigs is cooled by introducing a low boiling, liquified gas, it was found that this can be attained, according to the invention, by inserts in front or behind the vent, which force the outflowing gas to be deflected several times.

According to an advantageous design, the inserts consist of parallel plates of metal between which the gas flows in a meandering fashion. At least a few of the parallel plates can hereby be perforated. In case the buildup of an over-pressure is desired, the gas exhaust vent can be sealed by an automatic pressure equalizing device which clears the gas exhaust vent only at a predetermined pressure.

According to a further advantageous design, a box-shaped adapter is provided with intake vents for the exhausting gas, situated offset from the exhaust vent.

THE DRAWINGS

FIG. 1 shows a vent with inserts in the form of parallel plates, in accordance with one aspect of this invention;

FIG. 3 shows a vent with a box-shaped adapter in accordance with a further embodiment of this invention.

DETAILED DESCRIPTION

Figure 2:
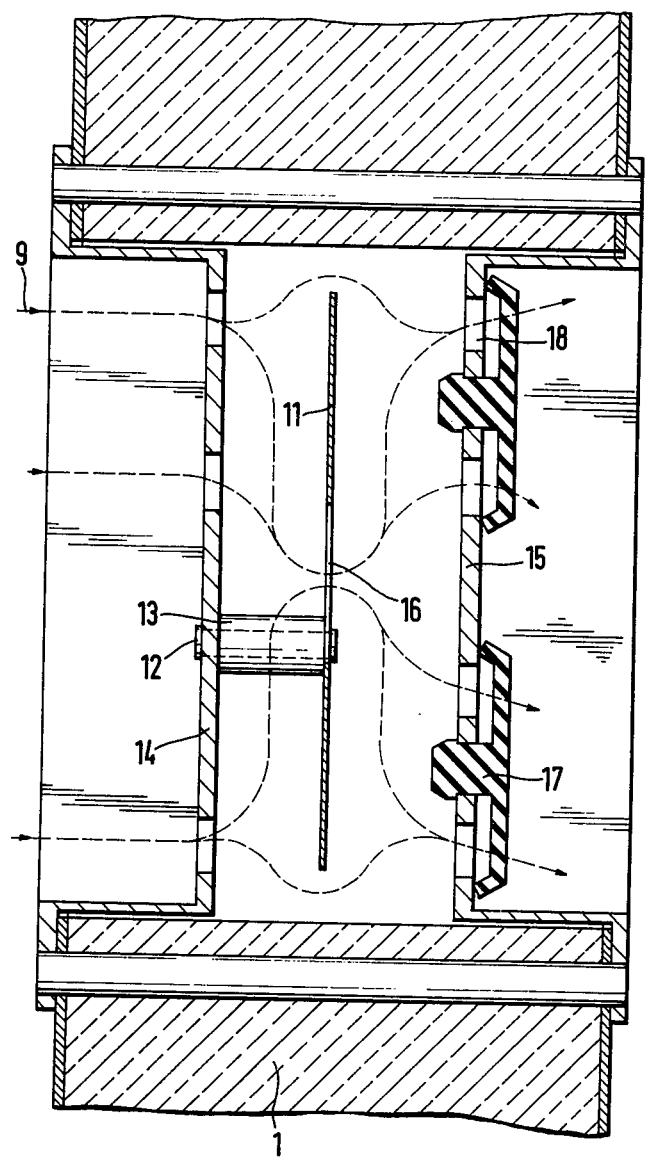
FIG. 2 shows a vent with parallel metal plate and rubber valve constructions as automatically operating pressure equalizing devices, in accordance with another embodiment of this invention.

The vent illustrated in FIG. 1 is located in the wall 1 of the cooling rig. It can, of course, also be in the door of the cooling rig. According to the invention, in the vent are found the parallel plates 2,3,4,5 between which the gas flows through in meandering or labyrinth fashion. The plates 2,3,4,5 are held together by screws 6, nuts 7, and spacer bushings 8.

The gas flow is indicated by the dotted line 9. The plates 3,4 and 5 are perforated so that the outflowing gas can flow through and around these plates. At the exhaust side, there is a damper 10 which, on account of its own weight or a magnetic catch, only opens when a given inner pressure is reached.

As a result of the gas flow through the multiple wound venting channels, icing of the exhaust vent is prevented, a condition which can occur especially with direct gas exhaust when the outflowing gas is at a temperature below the freezing point.

The embodiment according to FIG. 2 includes only one plate 11, which is located between two inserts 14 and 15. The plate 11 is attached to the insert 14 by means of rivets 12 with spacer bushings 13. In the plate 11 there is a bore hole 16, through which a part of the gas flows, another part is deflected around the outer edge of the plate 11. Rubber valve patterns 17 are attached to the insert 15, as automatic pressure equalizing devices which cover the exhaust openings 18. The rubber valves 17 free the opening 18 only in the presence of a given over-pressure.

With the embodiment according to FIG. 3, the vent is covered by a box-shaped adapter 19. According to the invention, the intake openings 20 for the exhausting gas are placed offset from the exhaust vent. With this embodiment the gas is also deflected several times, the direction of flow being shown by the arrows 21. In the exhaust vent itself, there are no further inserts, so that these also cannot ice.

Various applications of practicing the inventive exhaust vent are possible. Essentially such practice is always by means of inserts in front of or behind the exhaust vent, so that a multiple deflection of the outflowing gas is forced. At the same time, in accordance with customs regulations, the direct access to the interior of the cooling rig is prevented.

The invention's exhaust vent prevents with assurance an icing of the exhaust vent even when the outflowing gas is at a temperature below the freezing point. It furthermore makes possible, without any problems, the build-up of a desired inner pressure of, for example, 500 Pascals. As a result of the invention's inserts, direct access to the interior of the cargo is prevented, which is, for example, important when crossing borders, in order to comply with customs regulations. An additional security can be attached from the outside without any difficulties, as for example, an official seal. Aside from this, the inserts can be attached so that no thermal bridge is formed whereby the insulation is not impaired.

What is claimed:

1. In an exhaust vent for cooling rigs transported on vehicles, the interior of which is cooled by the introduction of a low boiling liquified gas, the improvement being a plurality of inserts mounted at the exhaust vent to comprise means which force the outflowing gas to be deflected several times, said inserts comprising parallel sheet metal plates between which the gas flows in a meandering fashion, at least some of said parallel plates being perforated, said perforations in said plates being staggered to force the gas exhausting therethrough to flow in a labyrynth path, said parallel plates including an intermediate plate which is perforated, said vent having a peripheral inner wall, said perforated intermediate plate extending to said peripheral inner wall of said vent whereby all exhaust gas must flow through its perforation, said plates further including a plate on one side of said intermediate plate which is not perforated and is spaced from said inner wall of said vent whereby the gas flows therearound, and said plates including a plate on the other side of said intermediate plate which is perforated and is spaced from said inner wall of said vent whereby the gas flows therearound and therethrough.

2. Exhaust vent according to claim 1, characterized in that all of said plates are maintained parallel to and spaced from each other by being mounted on common mounting elements.

3. Exhaust vent according to claim 1, characterized in that said plurality of plates comprises four plates.

* * * * *